INVENTORS.
CHARLES W. FINKL
HERBERT S. PHILBRICK, JR.
BY Parker & Carter
Attorneys.

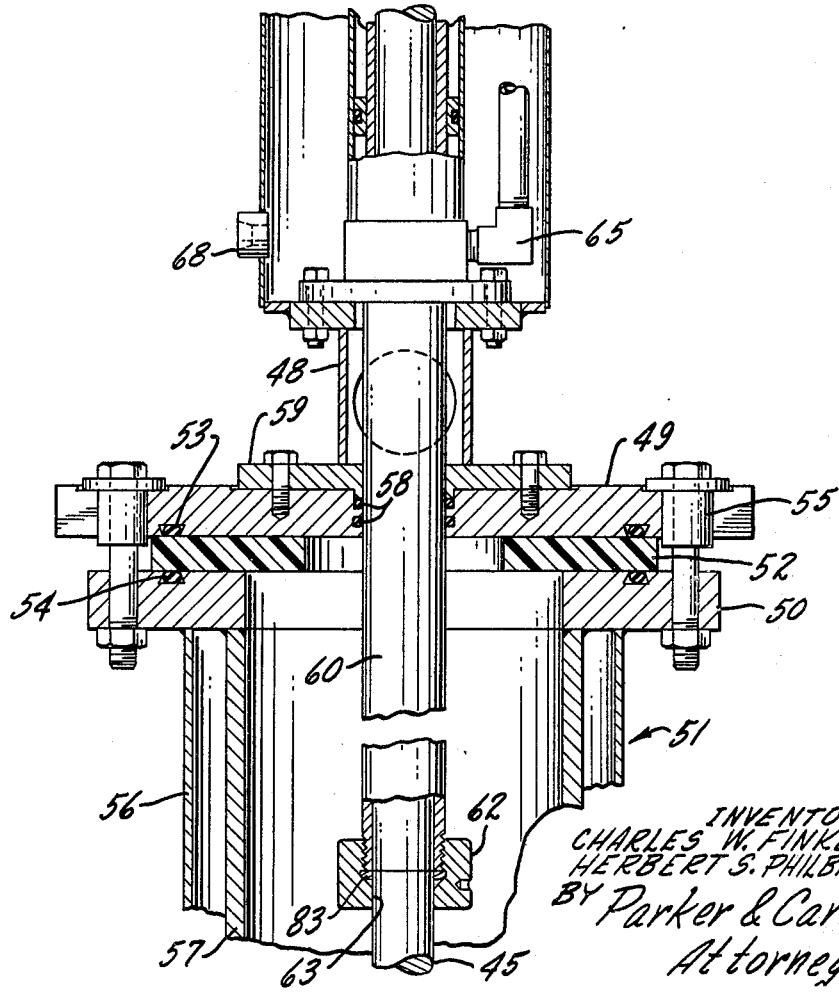

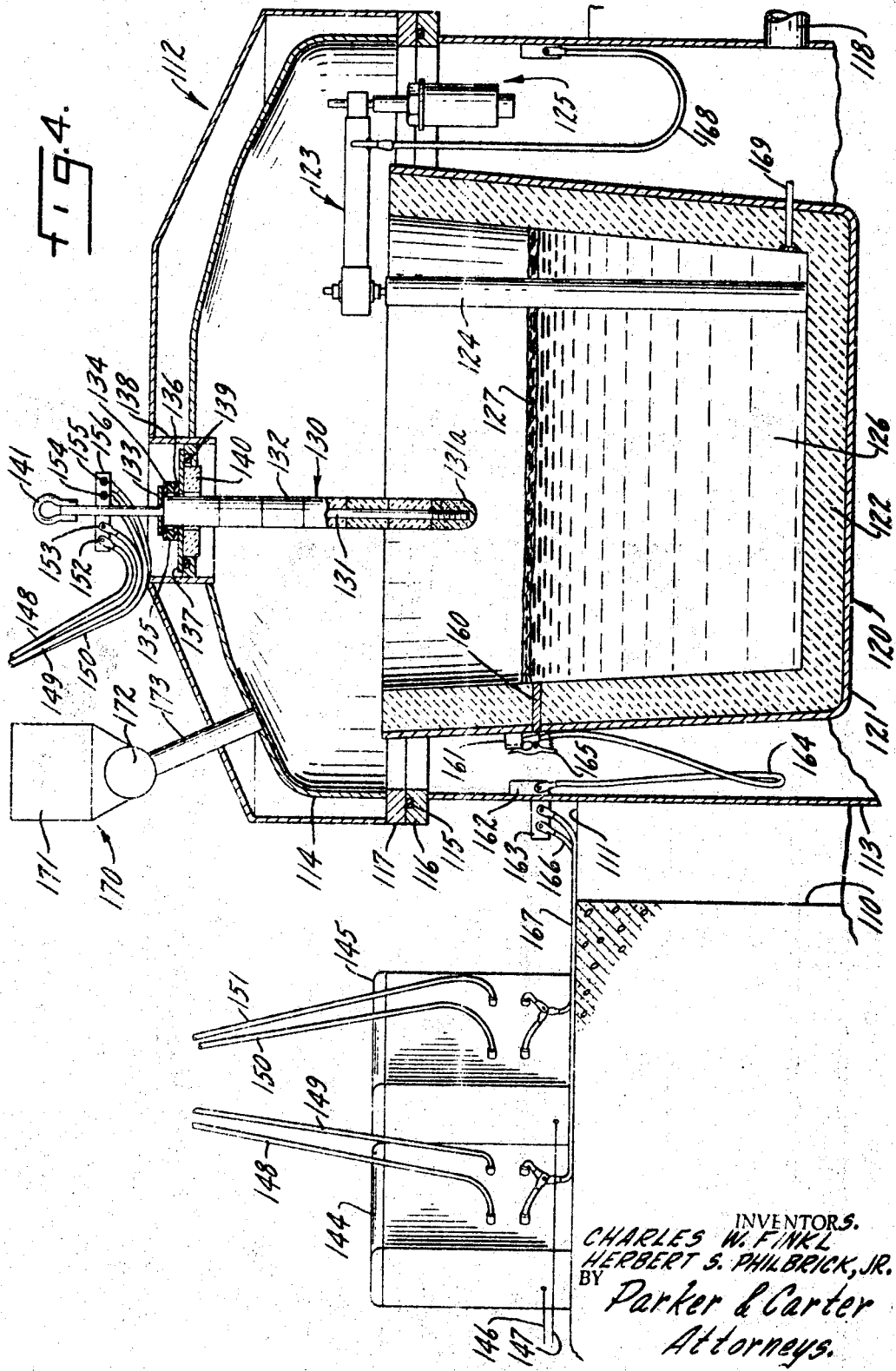

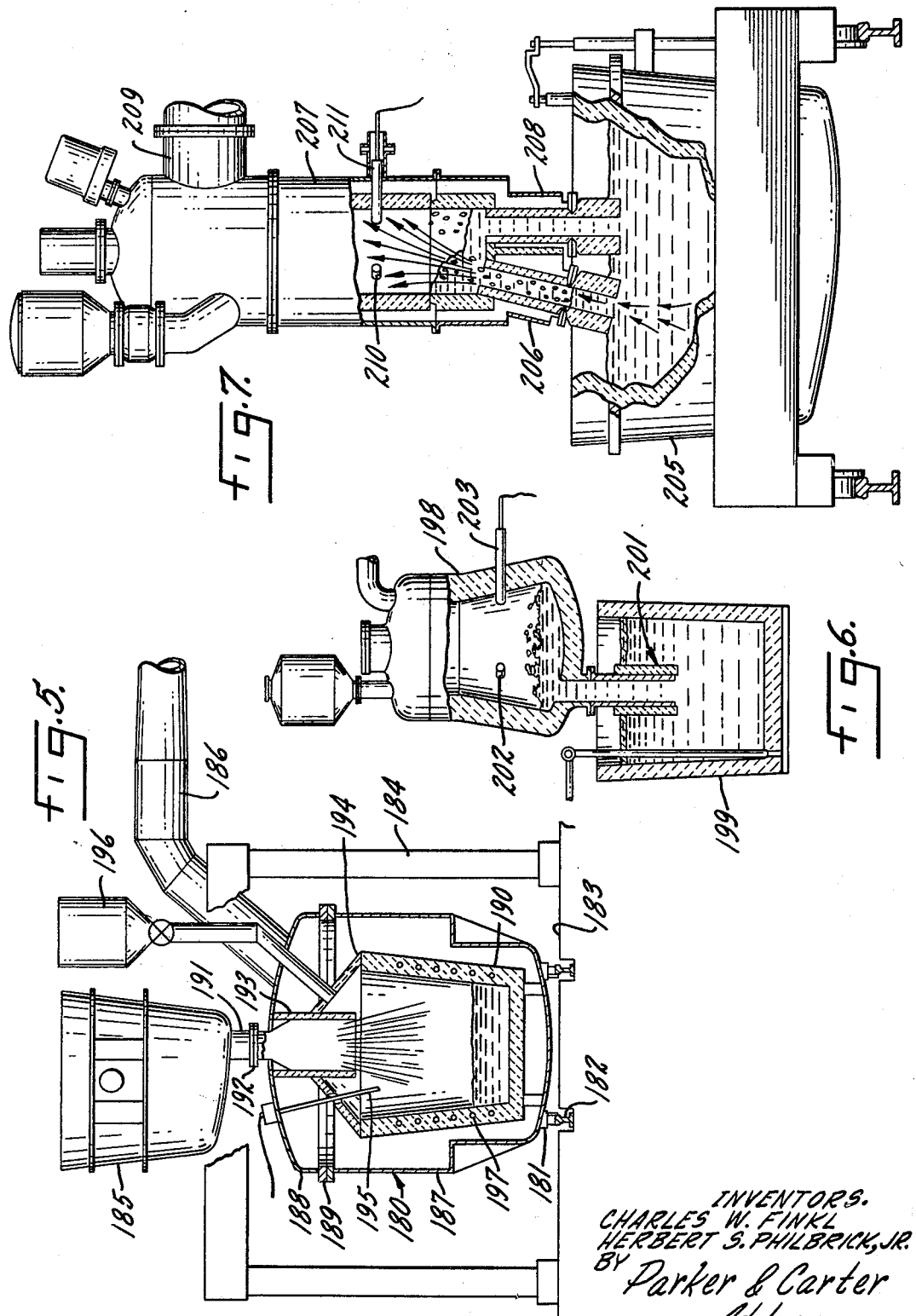

United States Patent Office 3,501,289
Patented Mar. 17, 1970

3,501,289
METHOD AND APPARATUS FOR ADDING HEAT
TO MOLTEN METAL UNDER VACUUM
C. W. Finkl and Herbert S. Philbrick, Jr., Chicago, Ill., assignors to A. Finkl & Sons Co., Chicago, Ill., a corporation of New Jersey
Filed June 9, 1965, Ser. No. 462,559
Int. Cl. C21c 7/10, 5/52
U.S. Cl. 75—12                                17 Claims

ABSTRACT OF THE DISCLOSURE

A method and apparatus for adding heat to molten metal under vacuum by use of an alternating current arc struck between non-consumable electrode means and the molten metal.

Figure 1:
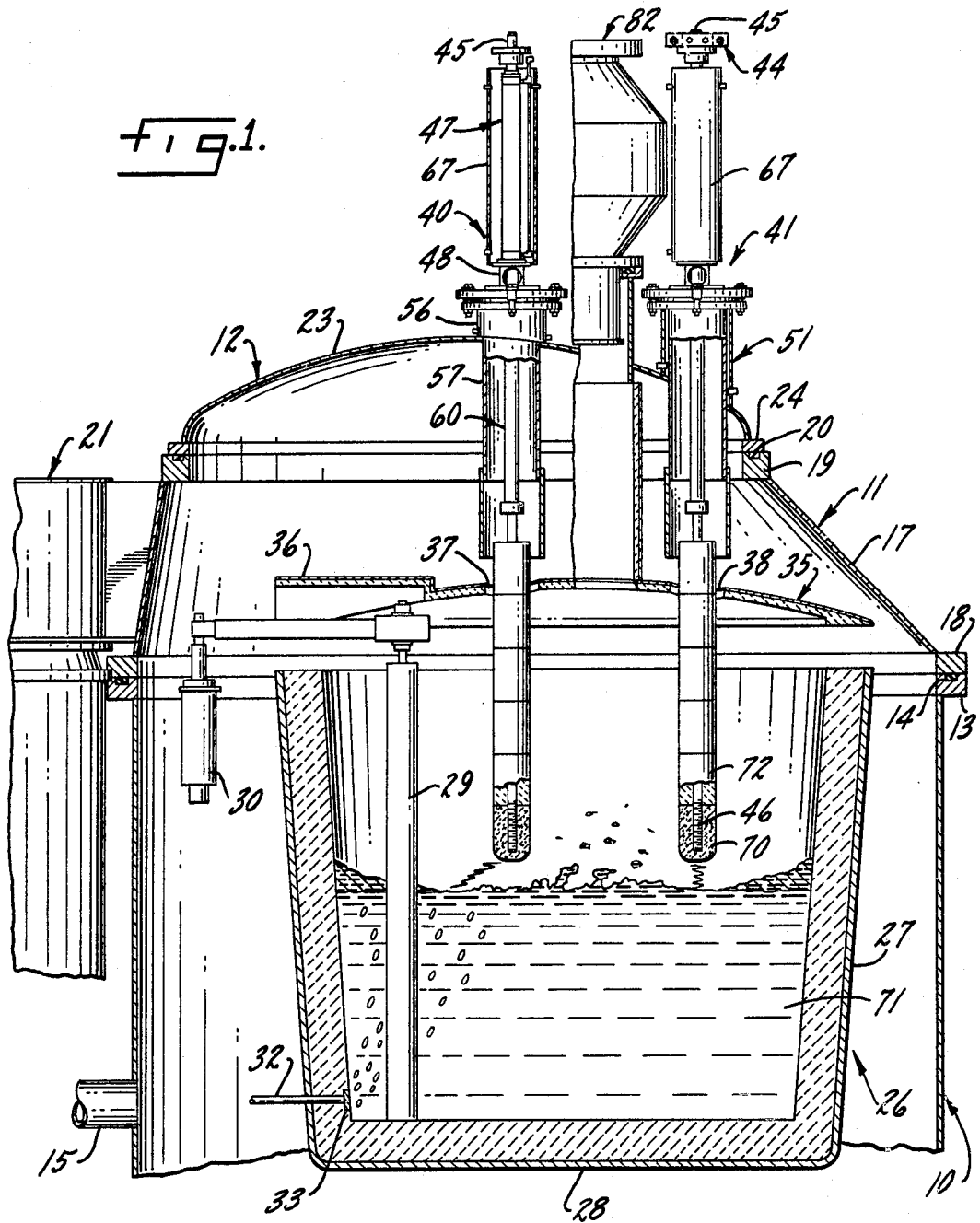

This invention relates to a method and apparatus for treating molten metal under vacuum, and particularly to a method and apparatus for adding heat to a melt of steel while the steel is exposed to a vacuum.

Methods and apparatus for subjecting metal in a vacuum environment to the heat of electric arcs have been known for some time. A common application of this concept is the consumable electrode type furnace. In this furnace a steel which has been air melted by conventional means is formed into the shape of an electrode and this electrode is then remelted by direct current under vacuum to produce a final ingot of very high quality steel.

So far as is known, however, no commercially practical method and apparatus has been employed to add heat to a substantial quantity of molten metal under vacuum by means of an AC arc.

There are a number of considerations which tend to indicate the undesirability of using an AC arc and possibly this is why the art has avoided AC systems. Alternating current continuously changes polarity and actually goes through zero voltage 60 times per second. At zero voltage the arc momentarily goes out, and it was thought the arc would not re-establish itself. Actual observation has confirmed that the arc does go out, but re-establishment has presented no problem. Further, it was thought that the low voltages associated with a DC arc would provide a more stable arc than could comparable AC voltages.

This invention, then, is directed to a method and apparatus for at least partially counteracting the temperature drop in molten metal by the employment of AC electrode means operated under vacuum conditions.

Accordingly, a primary object of the invention is to provide a method and apparatus for at least partially counteracting temperature drop, that is, heat loss, during a vacuum degassing operation.

Another object is to supply arc-generated heat to molten metal under vacuum which does not require arc control equipment.

Another object is to supply arc-generated heat to molten metal at very low absolute pressures which requires no deliberately added arc support means.

Yet a further object is to provide a method and apparatus for adding heat to substantial quantities of molten metal under vacuum by means of an AC arc.

Yet another object is to provide a method and apparatus for forming an extremely stable AC arc in a vacuum degassing system, said arc being quite insensitive to variations in arc length up to a distance of several feet, the location of the arc, and the angular disposition of the arc.

Yet another object is to provide a method and apparatus for adding heat by means of an AC arc to molten metal under vacuum conditions which is insensitive to the turbulence of the boil, and relatively insensitive to changes in the level of the molten metal within wide limits.

A further object is to provide a method and apparatus for adding heat to substantial quantities of molten metal under vacuum which requires only standard, readily available equipment, is lower in initial and operating costs than any other known system, and which is not unduly complicated in construction or operation.

Yet another object is to provide a method and apparatus for adding arc heat to large quantities of molten metal under vacuum which does not require grounding.

Another object is to provide a method and apparatus for adding heat to molten metal under vacuum which tends to localize or concentrate the heat added to the molten metal to thereby provide a relatively high heat input utilization factor.

Yet a further object is to provide a method and apparatus for adding heat to large batches of molten metal by the use of either single-phase or multi-phase AC power and non-consumable electrodes.

Yet a further object is to provide a method and apparatus for vacuum degassing ferrous alloys with or without agitation means such as gas purging agents or induction stirring coils in which heat is added by a vacuum arc which is established independently of the type and quantity of gases present in the vacuum environment.

Another object is to provide a method and apparatus for extending the vacuum treatment time to thereby obtain lower final gas contents than have hitherto been obtainable, including nitrogen.

Another object is to provide a method and apparatus for vacuum degassing molten metal whereby unwanted metal compounds, such as oxides of aluminum and silicon may be removed from the metal by the arc heat, thereby reducing the number of oxide inclusions in the metal.

Another object is to provide a method and apparatus for arc heating under vacuum in which a stable arc is formed at least in part by metal vapor or particles evolved from the melt.

Yet a further object is to provide an AC arc heating method and apparatus in which the arc is formed between an electrode, or electrodes, and the molten metal, the level of which may constantly change without significantly affecting the heating process or the stability of the arc.

Other objects and advantages of the invention will become apparent from a reading of the following description of the invention.

Figure 2:
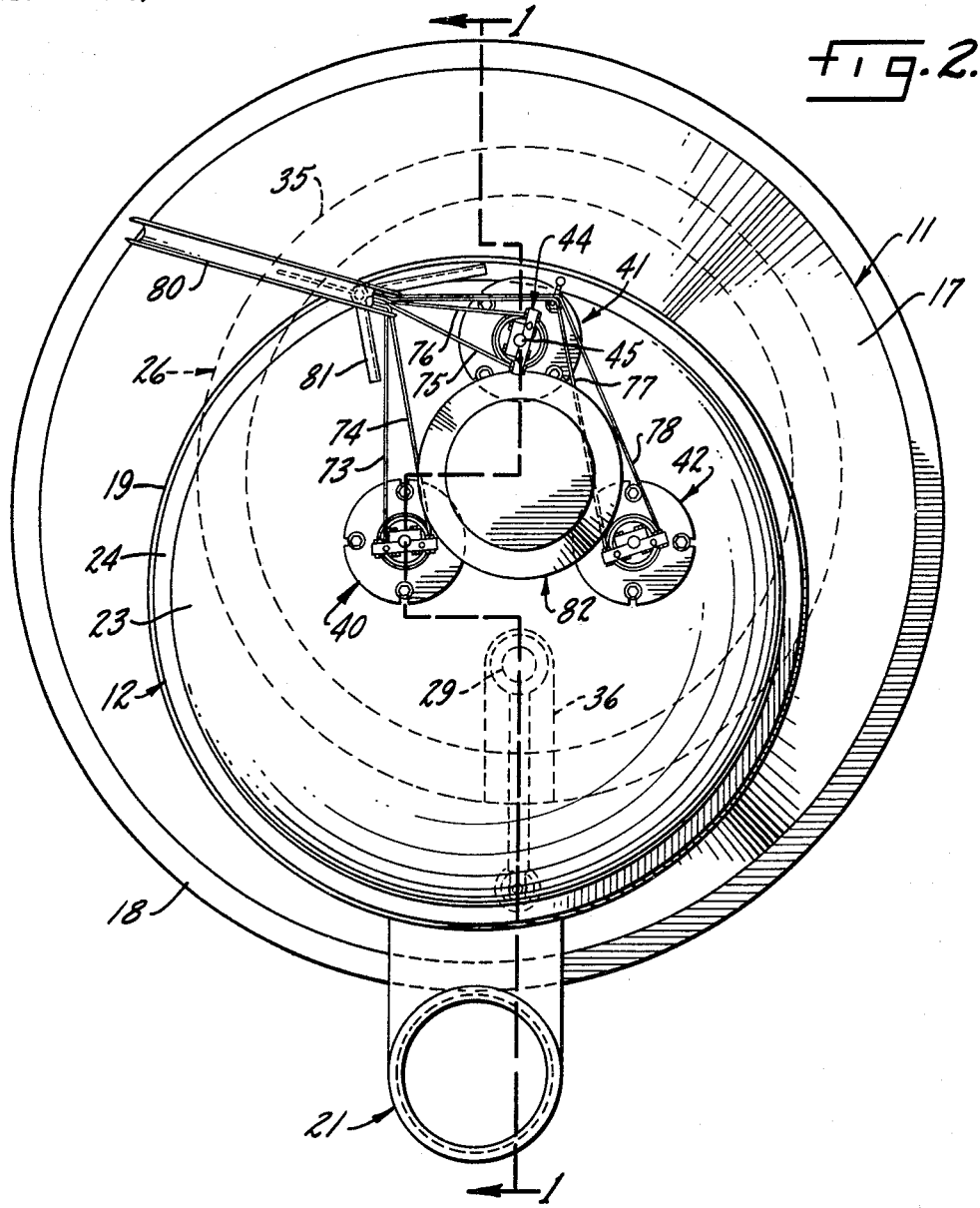

The invention is illustrated more or less diagrammatically in the accompanying figures, wherein:

FIGURE 1 is a vertical sectional view taken substantially along the line 1—1 of FIGURE 2;
FIGURE 2 is a top plan view of FIGURE 1;
FIGURE 3 is a detail view to an enlarged scale of portions of one of the electrode means shown in FIGURES 1 and 2; and
FIGURE 4 is a sectional view similar to FIGURE 1 illustrating another embodiment of the invention.

Like reference numerals will be used to refer to like parts throughout the following description of the figures.

Referring first to FIGURES 1, 2 and 3, there is shown a vacuum tank which consists essentially of a lower portion 10, an intermediate or transition section 11, and a cover assembly 12. The lower portion 10 consists essentially of a circular shell which terminates, at its upper edge, in a sealing flange 13 which has a groove in its upper surface for the reception of any suitable sealing means 14. An opening or conduit 15 connects the tank to any suitable vacuum system such as a multi-stage steam ejector system. If a steam ejector seystem is to be employed, the number of stages provided will depend to some extent upon the degree of vacuum it is desired to be drawn in the tank. In a tank of approximately 1,200 to 1,900 cubic feet capacity, a 4-stage steam ejector system capable of reducing the pressure to less than 1 millimeter of mercury absolute in from 5 to 10 minutes will be quite satisfactory.

The intermediate or transition section 11 includes a shell portion 17 which terminates at sealing flanges 18 and 19 at its lower and upper edges, respectively. As best seen from FIGURES 1 and 2 the shape of the transition section might best be described as a skewed frustum of a cone. Lower sealing flange 18 mates with upper sealing flange 13 and a seal is formed therebetween by the sealing means 14. A groove is cut in upper sealing flange 19 for the reception of suitable sealing means 20.

The transition section is raised and lowered and swung horizontally by a suitable lift and swing device indicated generally at 21. Since the details of the lift and swing device do not, of themselves, form an essential part of the invention they are not further illustrated or described. Cover assembly 12 includes an inverted dished member 23 which terminates at its lower edge in a sealing flange 24. An air-tight seal is formed between the transition section and the cover assembly by virtue of the sealing means 20 which is compressed between flanges 19 and 24 when the parts are in their FIGURE 1 relationship.

A melt shop ladle is indicated generally at 26. The ladle includes an upwardly extending side wall 27 and a bottom wall 28. A conventional stopper rod is indicated at 29, the stopper rod being raised and lowered by any suitable mechanism 30.

In this instance, the ladle has been modified to include means for agitating the metal. Said means are here shown as a gas admission conduit 32 which terminates in a suitable plug 33 which enables gas from a suitable source, not shown, to be admitted to the ladle near the bottom thereof. The gas, which is at a pressure slightly greater than the ferrostatic pressure of the molten metal ladle at its point of admission, passes upwardly creating a turbulence or stirring action which brings substantially undegassed molten metal from regions remote from the surface up to the surface where the vacuum is able to act upon it. Helium, argon, or desiccated air may be employed.

Although a gaseous purging arrangement has been illustrated and described it will be understood that the invention may be practiced with other types of stirring agents such as induction stirring coils. Alternately, means for inducing a mechanical stirring action may be dispensed with entirely, for the illustrated mode of operation is intended to be illustrative only.

A radiation shield is indicated generally at 35. The shield is supported by any suitable means, not shown, from either the transition section 11 or other structure, the exact mode of support not being an essential part of the invention. The shield has an offset portion, indicated at 36, to accommodate the stopper rod rigging, and three electrode apertures, two of which are indicated at 37 and 38.

Three electrode assemblies are indicated generally at 40, 41 and 42. Each electrode assembly passes through a suitable aperture in the cover assembly 12, as best seen in FIGURE 1. Since the electrode assemblies are identical a description of one will suffice for a description of all.

Each electrode assembly includes a generally T-shaped electrode head assembly indicated generally at 44. Said assembly 44 is composed of two parts which are clamped or otherwise removably secured to a crurent conducting rod 45 which functions as an electrode.

In the illustrated embodiment the rod is formed of one integral piece of stock which terminates at a lower threaded end 46.

The electrode and its associated structure is raised and lowered by a double-acting hydraulic cylinder and piston assembly indicated generally at 47. The cylinder assembly is bolted to a stationary electrode cylinder mounting spool 48 which in turn is fastened to a sealing flange 49. The sealing flange in turn is bolted to the top flange 50 of an electrode nozzle sub-assembly, indicated generally at 51, which is welded to and extends upwardly from the cover member 23. An isolating ring is indicated at 52, the ring being sealed against sealing flange 49 and top flange 50 by seal means 53, 54. The isolating ring may be made of any suitable material. A one-inch thick structural laminated resinous plastic sheet has been employed with success. The sealing flange 49 is bolted to top flange 50 by means of isolator bushings 55, which may also be made from structural laminated resinous plastic material.

A pair of concentric housings are indicated at 56 and 57. Housing 56 is welded in air-tight engagement to the underside of flange 50 and to the top surface of the cover assembly 12. Housing 57 extends downwardly to a level well below the top of the transition section, as indicated best in FIGURE 1.

The lower flange 59 of the electrode cylinder mounting spool, sealing flange 49, isolating ring 52, and top flange 50 are all apertured to slidably or freely receive cylinder rod 60. A double vacuum seal is indicated at 58.

Cylinder rod 60, which is preferably a hollow tube having an internal diameter sufficiently large to provide a slight clearance about electrode 45, is threadably engaged at its upper end to a rod seal flange 61, which in turn is bolted to electrode head assembly 44. The lower end of cylinder rod or tube 60 is threadably connected to an electrical connecting nut 62 which has an aperture 63 within which is received the electrode 45. A copper ring 83 ensures a good electrical connection between electrode 45 and cylinder rod 60. The abutting surfaces between rod seal flange 61 and the head assembly 44 and cylinder rod 60 may be tinned.

Combination inlets and outlets to the cylinder 47 are indicated at 64 and 65. Depending upon the direction of flow of the oil or other hydraulic fluid, the piston within cylinder assembly 47 will move up or down carrying electrode 45 and cylinder rod 60 with it.

A water jacket has been provided at 67 to prevent heating of the wall of cylinder assembly 47. An inlet 68 and outlet 69 provide for counter-current flow of the cooling fluid about the outside of the cylinder assembly.

The lower end of electrode 45 is threadably received in a graphite tip or nozzle 70. While the material of tip 70 may be varied, it is essential that it be electrically conducting in order to establish an arc between the electrode 45 and the surface of the molten metal 71. A plurality of conventional refractory stopper rod sleeves are indicated at 72.

Conventional three-phase power is supplied to the electrode head assemblies 44 by three pairs of conductors indicated at 73–74, 75–76, and 77–78. The electrical connection between the conductors and their associated electrode head assembly 44 is made by any suitable means. In this instance, each conductor is connected by a bolted assembly 79, the details of which are not essential to an understanding of the invention.

The six cables which conduct electricity from any suitable source are looped over a shoe 80 which in turn is supported by any suitable framework 81 from the cover assembly 12. Preferably, three-phase AC current of from 100 to 200 volts or more which is delta-connected is employed to supply power to the electrodes 45 from any suitable source.

A hopper assembly is indicated generally at 82. Alloy and/or slag-forming additions may be made at any desired time in the cycle by the use of the hopper assembly. For further explanation of the use and operation of the hopper assembly, reference is made to U.S. Patent 3,071,458.

Referring now to FIGURE 4, a vacuum degassing pit is indicated at 110, the lower portion of the pit extending beneath the level of the melt shop floor which is indicated at 111. A vacuum tank is indicated generally at 112, the tank in this instance including a stationary lower section 113 and a movable upper section 114 which may be lifted by a crane or a suitable lift and swing device. Suitable sealing means 115 located between abutting flanges 116 and 117 enable a vacuum to be drawn within the tank down to as low as a few microns of mercury absolute through a vacuum system, the outlet of which is indicated at 118. Preferably a multi-stage steam ejector system is employed.

A conventional molten metal receptacle is indicated generally at 120. The receptacle in this instance is a typical melt shop ladle having an exterior metal shell 121 and one or more layers of refractory materials 122 disposed within the shell. Conventional trunnions and supporting lugs have been omitted for purposes of description since they do not in themselves form an integral part of the invention. A stopper rod assembly is indicated generally at 123, the assembly including a stopper rod 124 which may be raised and lowered when desired by any suitable actuating mechanism indicated generally at 125. A quantity of molten metal which may, for example, be a ferrous alloy such as a low alloy steel is indicated generally at 126. In this instance, a thin layer of slag has been indicated at 127, the thickness of the layer being considerably less than the thickness normally present in non-vacuum operation. It may, for example, be on the order of an inch in thickness. Under some circumstances, as when the heat input means to be later described are of sufficient capacity, it may be quite feasible to eliminate the slag blanket altogether.

Electrode means for furnishing heat to the molten metal by AC power is indicated generally at 130. The electrode means consist, in this instance, of a single round steel rod 131 which may, purely by way of example, be on the order of 1¾ inches diameter. A graphite head is indicated at 131a and a plurality of substantially identical refractory sleeves at 132.

A circular contact plate is indicated at 133, the plate being welded to the steel rod 131. An annular rubber sealing member is indicated at 134, the sealing member in this instance being shown as extending slightly outwardly beyond the edge of plate 133. Any suitable air sealing material may be employed to insure an air-tight seal between the underside of plate 133 and the upper surface of seal ring 134. Another annular sealing member is indicated at 135. This latter sealing member may, for example, be a resin-cloth laminate insulator of a suitable thickness, for example, about one inch. A second annular rubber sealing member is indicated at 136, this seal ring 136 being secured to the laminate insulator by an adhesive which forms an air-tight seal therewith. The combination rubber-laminate insulator assembly rests upon a circular plate 137 which is located in a generally vertically oriented collar 138 formed in the upper section 114 of the vacuum tank. A refractory lined shield may be disposed above ladle 120 as illustrated in U.S. Patent 3,071,458. An O-ring seal or other suitable sealing means is indicated at 139 whose function is to provide an air-tight seal between the removable electrode and the vacuum tank. An annular refractory insulating ring 140 protects the lower surface of the plate 133 from the radiant heat of the melt.

A loop 141 or other suitable means such as a hook is provided at the top of the electrode so that the electrode may be handled from above by a crane or other lifting tool.

A plurality of welding machine housings are indicated at 144 and 145 for supplying AC power to electrode 131. In this instance, each housing 144 and 145 contains a pair of welding machine coils so that, in effect, four welding machines have been provided. Any suitable source of power, such as 220–360 AC power, is connected to input leads 146, 147. The wiring of the machines is so arranged that four heavy copper leads 148, 149, 150, 151 for conducting AC power to the electrode are provided. Since the wiring connections can readily be made by one skilled in the art they have not been illustrated for purposes of brevity.

The terminals 152, 153, 154 and 155 of the leads are connected to a terminal plate 156 which is welded or otherwise electrically connected to electrode 131.

The system may be grounded by means of one or a plurality of ground leads, an example of which is indicated at 160. Lead 160 is essentially an arcuate shaped sheet of conducting materials, such as steel, which is embedded in the wall of ladle 120. The inner edge of the ground member is in electrical contact with the molten metal in the ladle and the outer edge is welded or otherwise electrically connected to the steel shell 121 of the ladle. Preferably, the cross-sectional area of the ground member 160 is approximately equal to the cross-sectional area of electrode 131.

Three steel brackets are indicated respectively at 161, 162, and 163, bracket 161 being welded or otherwise electrically connected to shell 121 and brackets 162 and 163 being welded or otherwise electrically connected to the steel tank wall 113. A flexible ground lead 164 extends between bracket 162 and bracket 161 and is connected to the latter by a spring or C-clamp 165. A pair of ground leads 166, 167 connect bracket 163 to the ground terminals at the welding machines. A second ground system or a voltage probe is indicated generally at 168.

Preferably the ladle ground member 160 is composed of relatively thin gauge material, such as 10-gauge steel. It has been discovered that a sheet of this thickness will perform a grounding function but will not be melted by the heat of the metal in the ladle. Apparently, the heat transfer characteristics of such sheet material are such that the melting point is not reached even after exposure to the molten metal for extended periods of time.

Means for inducing an agitation within the melt is indicated at 169. In this instance a source of purging gas has been specifically illustrated.

A charge material addition assembly is indicated generally at 170. The assembly includes a hopper 171 which contains charge material for addition to the melt and a valve 172 which controls passage of the charge material from the hopper through the chute 173 into the vacuum tank. The charge material addition assembly, may for example, be of the type illustrated and described in Patent 3,071,458 to which reference is herewith made for a fuller description. It will be understood that the valve 172 may be either a vacuum-tight valve so that the hopper 171 may be opened during the treatment process to receive a subsequent charge of material, or it may be merely a restraining means for the charge material. In this latter event, the entire interior of the charge material addition assembly, including hopper 171, would be exposed to the vacuum in the tank. Charge material as used in this specification may be taken to describe alloying and/or slag forming materials.

In the embodiment of FIGURE 4, single-phase AC power is illustrated. In the embodiment of FIGURES 1–3 a similar system is disclosed with the exception that three electrodes have been provided in order to accommodate three-phase AC power. The use of three-phase power presents certain advantages to the user in that it results in a more balanced load on the plant's electrical power system.

The use and operation of the invention is as follows:

In the three-phase multi-electrode system of FIGURES 1, 2, 3 a substantial savings of temperature loss is effected by subjecting molten metal 71 to the AC arc during the time the metal is in the closed vacuum tank and exposed to the vacuum.

Cover assembly 12 and transition section 11 may be swung and elevated by the lift and swing device 21 as a unit. Prior to placement of a ladle into the tank, the double acting hydraulic cylinder assemblies will retract cylinder rods 60 so that the lower ends of electrodes 45 will clear upper flange 13 of tank portion 10. With the transition section and cover assembly swung aside, a ladle of molten metal which has been prepared from an electric furnace or any other suitable source is placed within lower portion 10 of the vacuum tank. It will be understood that at this point in the cycle the molten metal contains substantial quantities of included deleterious gases, particularly hydrogen, oxygen and nitrogen.

After placement of the ladle in the lower portion 10 the lift and swing device 21 places the transition section and cover assembly on the tank portion 10 in sealing engagement therewith and a vacuum is drawn in vacuum system 15. The hydraulic cylinders 47 are actuated to move the electrodes down to a position above the level of the boiling metal. The primary function of the hydraulic cylinder assemblies is to raise and lower the electrodes so that they will clear the lower portion 10 of the tank, and to estabilsh an initial position between the electrodes and the molten metal. The cylinder assemblies are not intended to function continuously during the degassing cycle, as is the case in conventional direct current arc furnaces in which the distance between the lower end of the electrode and the surface of the molten metal is continually electrically measured and regulated. They may be used, if desired, as a coarse manual adjustment. In a stream degassing system the metal level may vary six feet or more. In a ladle degassing system it may be advantageous to lower the electrode after a period of exposure to vacuum to follow the subsiding boil which decreases in intensity over the course of the cycle. In neither event however is there a continuous measurement of voltage, and regulation of electrode position.

Temperature drop savings of up to 40 degrees Fahrenheit and more have been recorded on steel treated in accordance with the principles of the present invention. For purposes of comparison, the following observed data is reported:

into ladle 120 from any suitable source, such as a conventional electric arc furnace which operates at substantially atmospheric pressure. It will be understood that the metal in its condition as tapped into the ladle and before any further treatment has occurred will nearly invariably contain substantial quantities of included deleterious gases such as oxygen, hydrogen and nitrogen. Further, the metal will have only a partial slag cover for reasons which are more fully explained in U.S. Patent No. 3,071,458. The filled ladle is transferred from the furnace tapping pit to the degassing station and placed within vacuum tank 113, as illustrated in FIGURE 4. The ground connection 164 is then connected. Alternately, and optionally, system 168 is connected.

Thereafter the top portion 114 of the tank is placed on the lower portion 113 and a seal formed between the abutting flanges 116 and 117. Finally, the electrode 130 is lowered into place. In this instance the electrode has been so constructed that its tip will be disposed about 12 inches above the top of the molten metal surface. It is quite feasible, however, to operate with the electrode tip up to and possibly more than several feet above the top of the molten metal surface.

It will be noted that a thin layer of slag 127 is present on the molten metal. In order to promote the degassing action the slag cover should be of less than normal thickness. Experience has indicated that under certain conditions a thin layer of slag is desirable in order to provide a blanket which protects the surface of the molten metal from (a) loss of temperature during teeming subsequent to degassing and, also (b) the reabsorption of deleterious gases should teeming be done under atmospheric conditions. One of the advantages of this invention, however, is that degassing may be completed with the molten metal at a higher temperature than it would ordinarily attain in the absence of the electrode 130, and consequently

NON-ARC HEATS

| Heat Number | Grade | Product weight, lbs. | Tap time, min. | Time to tank, min. | Time in tank, min. | Total time, min. | Before tap temp., °F. | After vacuum temp., °F. | ΔT, °F. | Time under 1 mm. pressure, min. | Lowest pressure before hopper addition or during cycle, microns | Slag volume* | H₂ | N₂ | O₂ |
|---|---|---|---|---|---|---|---|---|---|---|---|---|---|---|---|
| 145405 | X-3995 | 110,000 | 4:00 | 14:00 | 12:00 | 30:00 | 3,045 | 2,820 | 225 | 6.7 | 620+ L | | 1.4 | | |
| 155579 | X-4143 | 102,000 | 3:00 | 9:00 | 16:00 | 28:00 | 3,025 | 2,800 | 225 | 8.3 | 590+ M | | 1.1 | 20 | 25 |
| 155580 | X-4144 | 110,000 | 3:00 | 9:55 | 16:00 | 28:55 | 3,040 | 3,020 | 220 | (¹) | 2.1 mm.+ M | | 1.2 | 26 | 104 |
| | | | | | | | | | | | | | 1.4 | 24 | 52 |
| 155582 | X-4146 | 110,000 | 2:00 | 9:45 | 16:00 | 27:45 | 3,070 | 2,835 | 235 | 8.0 | 430 M | | 1.5 | 27 | 27 |
| 145317 | 4140 | 125,000 | 2:00 | 9:57 | 20:00 | 31:57 | 3,050 | 2,830 | 220 | 6:30 | 500 L | | 1.4 | 29 | 24 |
| 145299 | 4340 Mod | 125,000 | 3:00 | 7:52 | 20:00 | 30:52 | 3,110 | 2,845 | 265 | 4:30 | 550 L | | 1.5 | 22 | 81 |
| 145458 | Low Alloy | 133,000 | 2:00 | 9:55 | 22:00 | 33:55 | 3,065 | 2,830 | 235 | 7:00 | 700 M | | 1.5 | 25 | 33 |

ARC HEATS

| Heat Number | Grade | Product weight, lbs. | Tap time, min. | Time to tank, min. | Time in tank, min. | Total time, min. | Before tap temp., °F. | After vacuum temp., °F. | ΔT, °F. | Time under 1 mm. pressure, min. | Lowest pressure before hopper addition or during cycle, microns | Slag volume* | H₂ | N₂ | O₂ |
|---|---|---|---|---|---|---|---|---|---|---|---|---|---|---|---|
| 155647 | 4340 | 115,000 | | | 15:18 | 31:50 | 3,045 | 2,850 | 195 | 7.2 | 880+ M | | 2.0 | 30 | 62 |
| | | | | | | | | | | | | | 2.2 | 29 | 75 |
| 155660 | 4340 | 122,000 | 6:18 | 5:12 | 18:00 | 33:48 | 3,020 | 2,830 | 190 | 2.7 | 970+ (²) | | 1.6 | 27 | 31 |

¹ Over 1 mm. throughout.
² Very light.
* = Slag Volume; L=large, M=moderate or medium.
+ = No hopper addition.
Current values: Heat 155,660, 4,000+ amps. (Approx.); Heat 155647, 3,000+ amps. (Approx.).
Arc on Time: Heat 155,660, 10 minutes; Heat 155647, 11 minutes.

It will be seen from a comparison of the above arc versus non-arc heats that temperature savings of approximately 30 to 50 degrees have been effected. It will be noted that the above arc and non-arc heats all relate to processes which were approximately 30 minutes in length.

Even greater temperature drop savings can of course be effected by increasing the capacity of the electrical system. The invention contemplates the provision of electrodes of 4 to 24 inches in diameter, and larger. Similarly, heavier currents of 18,000 to 20,000 amps, or more, may be employed. With such capacities it may be possible to eliminate temperature drop or actually increase the temperature, depending of course on the physical characteristics of the system.

A single-phase AC power system for adding heat to molten metal under vacuum is illustrated in the embodiment of FIGURE 4. The molten metal 126 is tapped the necessity of a thin slag blanket is lessened. A seal is formed between the sealing member 134 and the plate 137 and the system thereby made vacuum tight. A vacuum is then drawn through conduits 118, preferably by a multistage steam ejector system. Such systems are now well known in the art and are effective to carry the vacuum from 760 millimeters of mercury down to less than 1 millimeter of mercury in a matter of minutes. In the embodiments of FIGURES 1 and 4 a 4-stage ejector system was employed which evacuates a vacuum tank of approximately 1,200 ft.³ to 1 mm. Hg in 7–9 minutes.

After the above described connections are made the power may be turned on and an arc formed between the electrode and the surface of the molten metal bath. In the 3 electrode 3-phase system of FIGURE 1, the voltage was maintained at about 80 volts. Observations during the arc treatment showed a bluish arc formed between the electrode and the bath. As the treatment progressed and the pressure decreased the arc became progressively more stable. The arc, however, always was formed between the electrode and the molten metal bath and showed no tendency to strike to the stopper rod or the ladle wall.

Under certain conditions it may be highly desirable to agitate the metal during treatment so as to speed the degassing action and promote homogeneity and good pouring characteristics. In this instance a purging gas is shown being bubbled upwardly through the melt during the treatment from source 169. Any suitable gas may be employed, and dessicated air has proven entirely satisfactory. The arc will, however, continue even in the absence of a purging agent. Other gases such as the inert gases, reactive gases, and possibly $CO_2$ may also be purged through the bath.

In this connection, it should be noted that the disclosed invention relates to operation in a vacuum atmosphere. That is, introduction of a specific arc supporting gas is not relied on for maintenance of the arc, and no particular type or concentration of atmosphere appears necessary to successfully practice the process.

The spacing between the electrode and the molten metal is not especially critical. Spacings of from three inches up to over three feet have been employed successfully. The actual spacing will, of course, vary at any instant during any process because of the agitation of the melt. A purging gas passing upwardly effectively raises and lowers the surface of the melt so that the distance between the electrode tip and the surface of the metal may, for example, be about three inches during purging, and about six inches when no purging or other agitation means are employed. It is unnecessary however to change the position of the electrodes due to the presence or absence of a stirring agent, or variations in the intensity of the boil.

Substantially the same procedures are followed in connection with the processes of FIGURES 5, 6 and 7 and accordingly a descritpion of the operation of the embodiments of these figures is not deemed necessary.

With the three-phase power system, the electrode diameters may be smaller for any given power input as compared to a single-phase system. Also, the three-phase system is operable with zero current flowing through a grounded ladle which system would be Y connected and may be operated with an open neutral. Both conditions eliminate the problem of passing heavy currents through the ladle brick to ground. In the single-phase system of FIGURE 4 it will be observed that a ground is established by means of the ground insert 160 which is in contact, at its inner edge, with the molen bath, and at its outer edge with ground conduit 164 which in turn is grounded into the welding machine casings 144 and 145. The single-phase system, of course, has the advantage of requiring only one electrode as contrasted to three for the three-phase system, and the lesser number of electrodes simplifies the sealing problem and has a lower apparatus cost, at least for small plants of about ten ton capacity or less.

In any of the embodiments, additions may be made during vacuum treatment by the hopper structure.

Under some circumstances it may be desirable or even advantageous to be able to control the elevation of the electrodes above the surface of the molten metal bath during the degassing treatment.

It appears that the above-described system results in a good ratio of added heat to retained heat. The confinement of the arc to the surface of the molten metal, as contrasted to an arc struck between two electrodes maintained some distance away from the surface of the molten metal, results in a high heat input to the molten metal. If a refractory heat conservation shield is employed, it is apparent that the heat input will be concentrated in the vicinity of the area of the surface. This is in contrast to the formation of an arc which diffuses throughout the vacuum chamber and serves only to superheat the vacuum chamber and the container. Superheating of these elements is not desired in the present invention and may under some conditions actually be detrimental.

Furthermore, the disclosed process has the advantage of adding heat directly to the source of greatest heat loss which is radiation from the metal surface. The AC arc of this invention adds heat directly to the exposed metal.

The exact mechanics underlying maintenance of the arc are, at the moment, a matter of some speculation. It appears that there may be sufficient metal vapor or particles leaving the surface of the bath to support an arc and this may well account for the maintenance of an arc in the absence of any purging gas at absolute pressures on the order of a few mm. of mercury or less.

One of the great advantages of the present invention is the fact that the introduction of heat permits the extension of the cycle time. To date, vacuum degassing processes have fairly successfully reduced the hydrogen and oxygen content of the molten metal but by and large the nitrogen content has been affected to only a minor degree. Though nitrogen may not be as serious an offender as oxygen and hydrogen, nevertheless, under certain conditions, it can be a definitely unwanted element in certain types of steels. By lengthening the cycle, more time is available for the evolution of gases, including nitrogen, from the bath, and accordingly the attainment of a lower final included gas content.

The disclosed invention will also facilitate the removal of oxides, such as oxides of aluminum, and silicon. That is, the temperatures of the unwanted metal compounds, such as aluminum oxides, in the region of the arc may be elevated to a point at which these compounds vaporize at the low pressure in the vacuum tank. Once vaporized, they may be pumped off by the vacuum system. This raises the possibility of at least reducing and possibly eliminating the instigation of chemical reactions to perform these functions.

Another interesting arc phenomena has been observed to occur during single phase operation. When purging gases are employed the arc will occasionally form between the electrode and the area of the surface from which the purging gases leave the melt. It is not known with certainty whether the purging gas is ionizing to form an electrical field or whether the evolution of metal vapor or particles is most pronounced in this area. Since the arc tended to stabilize in an area below the electrode as the treatment progressed, it is possible that the ionized gas is a better arc supporting field than the metalized ion vapor since the quantity of gas evolved is presumably at a greater concentration earlier, as contrasted to later, in the process.

It will also be noted that there are no tramp or extraneous gases present in the vacuum chamber. In this application, the term "tramp" or "extraneous" gases is used to denote the presence of gases deliberately added to form an arc supporting or ionizing atmosphere as contrasted to gases which may be bubbled through the melt to serve as a means of agitating the melt. Such agitating gases are equivalent for all practical purposes to the gas bubbles, particularly CO bubbles, which are evolved from the melt oven in the absence of any external agitation means.

It has also been observed that the arc has the beneficial effect of blowing slag away from the area of the molten metal to which it strikes and this condition is illustrated in FIGURE 1. It has been established that best degassing results are obtained when the surface of the molten metal is free, or relatively free, of a slag blanket. The absence of a layer of slag, however, has the disadvantageous effect of enabling heat to be lost at a more rapid rate than when a slag blanket is present. It is now possible to practice the process with a slag blanket on the metal which is slightly thicker than the slag blanket described in Patent No. 3,145,096, though thinner than the conventional non-vacuum slag. This has the further beneficial effect of reducing the rabbling time at the furnace which therefore makes available more vacuum tank treatment time.

Another benefit of the invention is that it may make commercially practical degassing processes which were once thought in certain quarters to be unfeasible for certain installations due to supposedly undesirable temperature losses.

The demonstrated ability of an alternating current arc to function effectively under vacuum as hereinbefore described is rather unexpected. Heretofore, it was thought that the fact that the arc goes out 60 times per second (when 60-cycle power was employed) was too great a hindrance to permit operation of an AC arc under vacuum, especially when the surface level was constantly changing as occurs when a CO boil is present. It is generally agreed in the art that striking and maintaining a DC arc requires some skill and, as is well known, once such an arc goes out, the electrode must be lowered and brought into contact with the metal before it may be restruck. The requirement of starting and extinguishing an arc 60 times or more per second quite possibly accounts for the use of DC arcs to the exclusion of AC arcs for adding heat to molten metal under vacuum up to now. Actual photographic observation of the behavior of the arc has confirmed the fact that the arc does indeed go out many times per second but, contrary to expectations, the maintenance of the arc has proven to be no problem, even under widely varying conditions of arc length.

Although several embodiments of the invention have been illustrated and described, it will at once be apparent to those skilled in the art that other modifications may be made within the spirit and scope of the invention. Accordingly, it is the intention that the invenion be construed and limited solely in terms of the hereinafter appended claims.

We claim:
1. In a method of counteracting heat loss from molten ferrous metal during post-melting treatment of said molten mental in a batch process, the steps comprising
   providing a quantity of molten ferrous metal having an undesirably high quantity of deleterious gases therein,
   establishing a vacuum above the molten metal of a magnitude sufficient to effectively degas the molten metal, and
   during at least a substantial portion of the time the molten metal is subjected to the aforesaid vacuum,
   operating an alternating current heating arc between non-consumable electrode means and the molten metal.
2. The method of claim 1 further including the step of agitating the molten metal during subjection of the metal to the alternating current heating arc.
3. The method of claim 2 further including the step of adding charge material to the molten metal under vacuum.
4. The method of claim 1 further including the step of agitating the molten metal during subjection of the metal to the alternating current heating arc by passing a purging agent upwardly through the molten metal.
5. The method of claim 4 further characterized in that the purging agent is admitted to the molten metal substantially at the bottom level thereof.
6. The method of claim 1 further including the step of agitating the molten metal during subjection of the metal to the alternating current heating arc by induction stirring.
7. The method of claim 1 further characterized in that the slag blanket, if any, on the molten metal is of a decreased thickness.
8. The method of claim 1 further including the step of maintaining the vacuum at about 1 mm. Hg absolute or below during at least a portion of the time the molten metal is exposed to the vacuum.

9. The method of claim 1 further characterized in that the alternating current arc is formed from single phase current.
10. The method of claim 1 further characterized in that the alternating current arc is formed from multi-phase current.
11. The method of claim 10 further including the step of stirring the molten metal during subjection of the metal to the alternating current heating arc.
12. The method of claim 10 further including the step of stirring the molten metal during subjection of the metal to the alternating current heating arc by passing a purging agent upwardly through the molten metal.
13. In a system for reducing heat loss during vacuum treatment of molten metal, the combination of
   structure for forming and maintaining a vacuum environment above
   a receptacle which contains a batch of molten metal having an undesirably high quantity of deleterious gases therein,
   non-consumable vertically oriented electrode means having their terminal ends disposed closely adjacent the surface of the molten metal to thereby form a continuously stable arc directly with molten metal in the receptacle, and
   a multi-phase alternating current power source connected to the electrode means whereby said alternating current heating arc may be established between the electrode means and the molten metal,
   said vacuum structure having the capability of creating and maintaining a vacuum sufficiently low to effectively degas the molten metal while the alternating current heating arc is in operation,
   said alternating current power source being effective to maintain said arc during vacuum conditions.
14. The system of claim 13 further including means for agitating the molten metal during subjection to vacuum to thereby cause portions of the molten metal having included deleterious gases therein to be moved from areas remote from the surface to the surface where they may be exposed to vacuum at the surface.
15. The system of claim 14 further characterized in that the means for agitating the molten metal comprises gas purging means.
16. The system of claim 15 further including means for adding charge materials to the molten metal prior to termination of vacuum.
17. The system of claim 15 further characterized in that the molten metal is held in a refractory lined receptacle.

References Cited
UNITED STATES PATENTS

| | | | |
|---|---|---|---|
| 963,652 | 7/1910 | Reynolds | 75—49 X |
| 2,882,570 | 4/1959 | Brennan | 75—49 X |
| 2,893,860 | 7/1959 | Lorenz | 75—49 |
| 2,929,704 | 3/1960 | Harders | 75—49 |
| 3,024,102 | 3/1962 | Brown et al. | 75—10 |
| 3,033,550 | 5/1962 | Harders | 75—49 X |
| 3,224,868 | 12/1965 | Philbrick. | |
| 3,236,636 | 2/1966 | Finkl | 75—49 |

FOREIGN PATENTS

| | | |
|---|---|---|
| 602,449 | 7/1960 | Canada. |
| 613,372 | 1/1961 | Canada. |
| 871,659 | 6/1961 | Great Britain. |
| 812,216 | 4/1959 | Great Britain. |

HENRY W. TARRING II, Primary Examiner

U.S. Cl. X.R.
75—1.0, 49; 266—34